April 30, 1940.   C. S. JOHNSON   2,199,289
CENTRAL MIXING PLANT
Filed Feb. 6, 1935   2 Sheets-Sheet 1

Inventor
CHARLES . JOHNSON.
By Robt Robt
Attorneys

April 30, 1940. C. S. JOHNSON 2,199,289
CENTRAL MIXING PLANT
Filed Feb. 6, 1935 2 Sheets-Sheet 2

INVENTOR
CHARLES S. JOHNSON.
BY
Robert Cobb
ATTORNEYS

Patented Apr. 30, 1940

2,199,289

UNITED STATES PATENT OFFICE 2,199,289

CENTRAL MIXING PLANT

Charles S. Johnson, Champaign, Ill., assignor to The C. S. Johnson Company, Champaign, Ill., a corporation of Illinois Application February 6, 1935, Serial No. 5,298

6 Claims. (Cl. 259—152)

In the art of mixing concrete today, where the production of mixed aggregates is very large, as when thousands of cubic yards of concrete are required to be economically produced for large undertakings such as dams or the like, central mixing plants are customarily employed. These plants customarily comprise a series of associated bins or hoppers in which the separate aggregates or materials to be mixed are stored temporarily, a plurality of batchers to receive and measure the predetermined quantities of the different aggregates which go to make up the batch to be mixed, and one or more mixers to receive the batched aggregates from the batchers for agitation a predetermined length of time, thereafter to be discharged in the form of the mixed concrete.

By reason of the considerable sizes of the storage bins or hoppers, batchers, mixers, and other associated parts, and for efficient operation, the said features of a central plant are commonly assembled upon a relatively large supporting framework suitably fabricated and carrying at its uppermost portion the storage or supply bins which are replenished by conveyers which carry the materials or aggregates to the bins from a lower elevation. Thus it is that gravity may be availed of to cause the transfer of the aggregates in the storage bins to the batchers located beneath said bins, from the batchers to a collecting hopper, from the collecting hopper to the one or more mixers provided to perform the agitating work and properly mix the aggregates, and from the mixers to a suitable mixed concrete hopper from whence they may be delivered on tram cars, endless belts, or the like, for transportation to the site of erection where the mixed concrete is to be used.

Owing to the arrangement of the various features of the plant as above set forth, to facilitate the gravity feeding from the storage or supply bins to the point where the mixed concrete is carried off for use, central plant structures heretofore designed have been required to be of very considerable height. This height is increased materially by the use of the gravity chute means availed of to carry the batch measured aggregates from the collecting hopper to the mixer or mixers, it being borne in mind that these aggregates are primarily in dry state, on which account a relatively steep inclination of the said chute means is required to ensure the proper gravitating movement of the aggregates to the mixers.

In central mixing plants as heretofore designed, the chute means leading from the collecting hopper to the mixers has been associated with mixers equipped with discharge means at one end and charging means at the opposite end of each mixer, and therefore relatively steep inclined chute means has been availed of to carry the aggregates from the collecting hopper to the mixers at the charging ends of the latter. One of the discharging means for the mixers has heretofore been associated with a common mixed concrete hopper located at the adjacent discharging ends of the mixers. The objection to the arrangements just referred to for the purpose of carrying the unmixed aggregates from the collecting hopper to the mixers and then from the mixers to the common mixed concrete receiving hopper are evident, bearing in mind that when relatively steep chute means are required to direct the unmixed aggregates to the mixers at outer or relatively remote ends thereof, the steep inclination of the chute means is needed, and the aggregates or materials are furthermore required to be discharged into the charging ends of the mixers by an angular movement, first in an outward direction, and then in an inward direction. The angular movement of the aggregates obviously retards the flow thereof and slows down the charging action of the mixers to a material extent.

Now a primary objective of this invention has been to so design a central mixing plant and the associated chute supply means leading from the collecting hopper to the mixers, together with the mixed concrete hopper, that the mixer or mixers utilized each have a charging point and discharging point substantially in the same vertical plane. Thereby the aggregates passing from the collecting hopper to the mixers may be caused to enter the mixers at a charging point about in the same vertical plane as is the plane for discharging of the aggregates from the mixers. The points of common charging and discharging of the mixers, moreover, are caused to be disposed as closely as possible to the central axis of the entire plant, so to speak, which axis coincides with the axis of the mixed concrete hopper that receives the mixed concrete from the mixers.

By an arrangement of the mixers in reference to their charging and discharging points, as above set forth, and locating the said charging and discharging points closely to the central axis of the plant, I am enabled to accomplish several distinct advantageous results. First, I use a steeply inclined turn head supply chute leading from the bottom of the collecting hopper to the mixers, by which the aggregates may be very quickly precipitated by gravitative movement into the charging portions of the mixers. Secondly, I am enabled to use such a turn head supply chute means which is far shorter than the previously employed long chutes required, thus permitting the entire framework of my central plant to be lowered and reducing the weight thereof and the amount of fabricated metal therein to a substantial degree. This affords an economy in the cost of construction that is found highly desirable. Thirdly, I avoid the multi-direction feed heretofore made necessary in conducting the aggregates or materials from the collecting hopper to the mixers, which type of feed has retarded the operation of the plant by slowing down the periods of time required for the aggregates to be charged into the mixers. Finally, I obtain by my construction and arrangement of the mixers, as combined with the charging instrumentalities therefor, a generally more compact arrangement of the plant construction as regards these particular features, as will be more fully apparent upon reference to the following description in conjunction with the annexed drawings, in which—

Figure 1 is a view in elevation of a central mixing plant embodying a preferred form of the invention, wherein tilting mixers, each having a common charging and discharging portion, are availed of.

Figure 3:
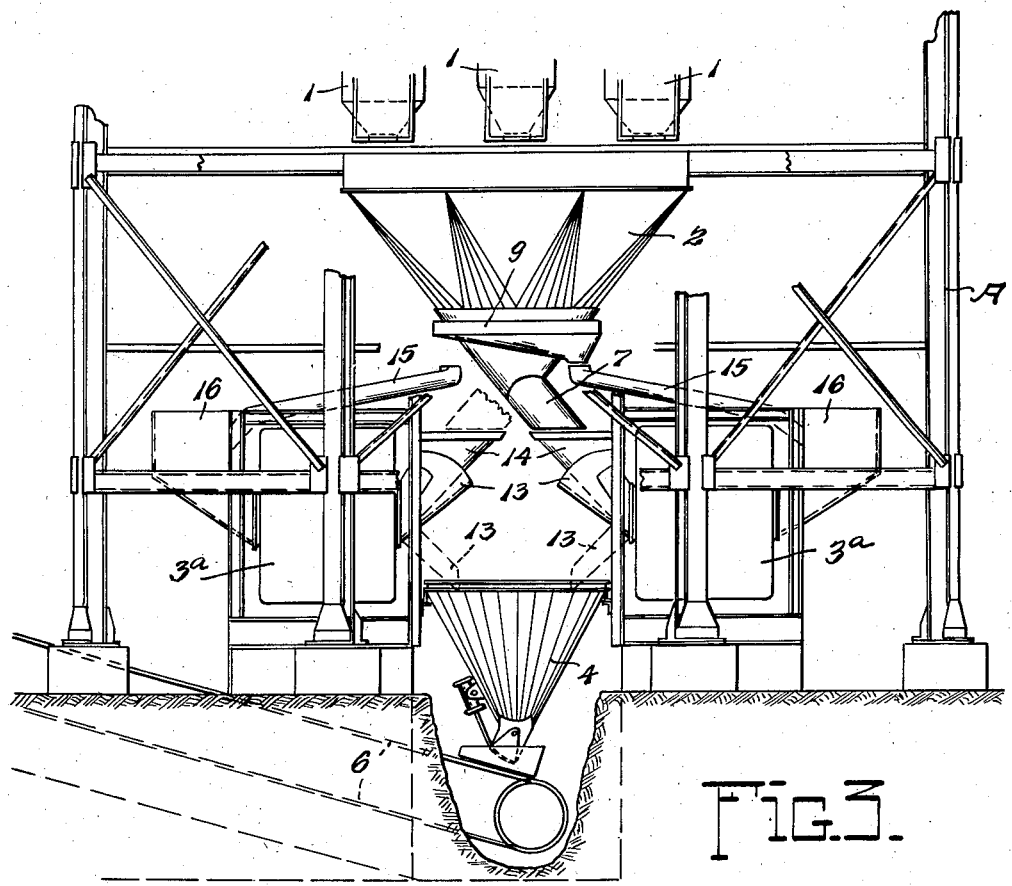

Figure 3 is an enlarged view showing primarily the lower portion of a central mixing plant including the lower portions of the batchers, the collecting hopper, the turn head feed or distributing chute for the mixers, the mixers, and the mixed concrete hopper, the mixers in this type of apparatus being of non-tilting type and employing each a single charging and discharging chute cooperating with the turn head feed chute and the mixed concrete hopper, respectively.

Figure 4:
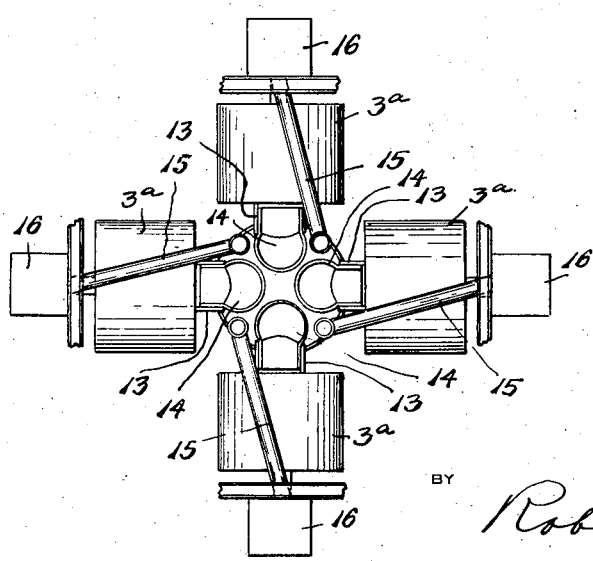

Figure 4 is a somewhat diagrammatic illustration of the mixer arrangement as shown in Figure 3 the disposition of the water supply pipes or conduits being brought out clearly.

Figure 1:
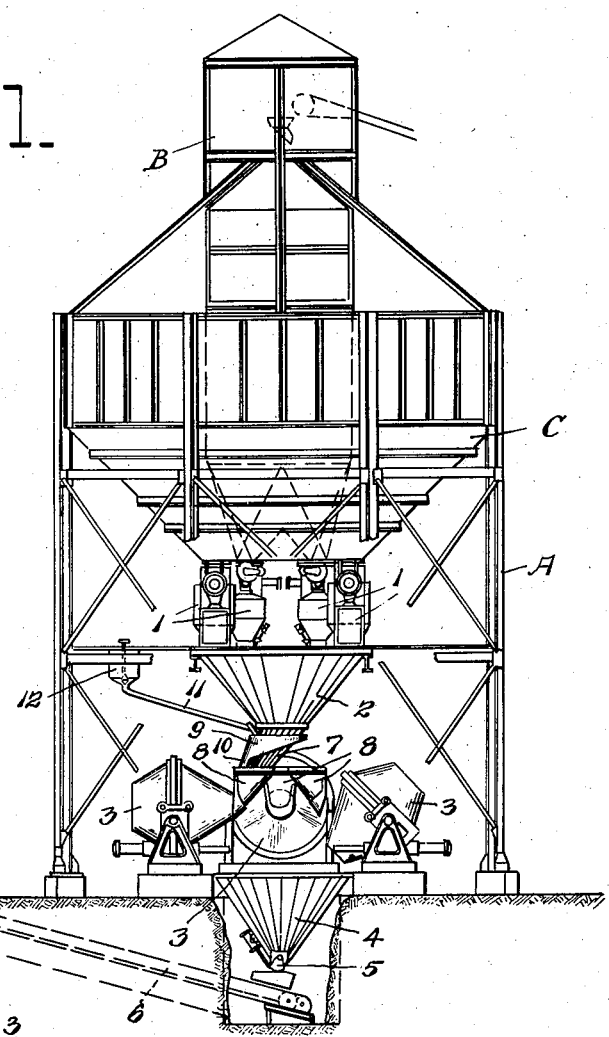
Figure 2:
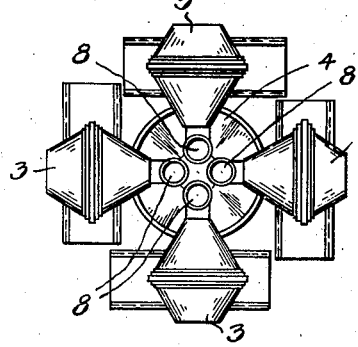
Figure 2 is a somewhat diagrammatic plan view bringing out more clearly the relative disposition of a battery of mixers such as may be employed within the purview of the invention.

I shall refer first to the plant which is depicted by Figures 1 and 2 of the drawings, the same being largely of a conventional type excepting as regards the novel features and arrangements employed as previously outlined herein. This plant comprises the fabricated framework A of any suitable type, at the top of which is a head house B, up to which there are conveyed by belt means the various aggregates to be brought together to provide the ultimate mixed concrete. The said aggregates are supplied by suitable chute means in the head house to different ones of a plurality of bins which are located beneath the head house and are comprised of separate compartments of a general bin structure C, well known to those versed in the art. The said separate compartments will contain a suitable supply of cement, one or more grades of sand, and one or more grades or sizes of each gravel and stone. Or, if a single standard of batching of materials is employed, the aggregates will simply comprise the cement, sand, gravel, and stone materials, each of a predetermined standard. All of the foregoing is unessential to the present invention.

Now beneath the bin structure C are located a plurality of batchers 1 which are really measuring receptacles, one provided for each of the aggregate compartments of the bin structure C. The aggregates are measured or batched in the batchers 1, and under suitable control are caused to pass to the collecting hopper 2 when the predetermined quantities of the aggregates established by the measuring action of the batchers are to be supplied to a mixer after the well known manner. To obtain high production, a plurality of mixers 3 will be availed of, the number depending upon the extent of production required for the plant. The mixers 3 illustrated in Figures 1 and 2 are of the tilting type embodying rotatable drums capable of being rocked downwardly at their inner ends for discharge purposes. It is contemplated that the drums of the mixers 3 shall be closed at their outer or remote ends, whilst the inner ends of the drums shall be opened to provide common charging and discharging portions. Below the mixers and on an axis centrally disposed between the adjacent inner ends of the mixers may be located a mixed concrete hopper 4 and the area above the upper wide open end of said hopper 4 may be characterized as a discharge zone, having in view the relation of this area to the discharging actions of the mixers.

The mixed concrete hopper 4 which may receive the ultimate or end mixed product may be equipped with a discharge 5, and the mixed contents of the hopper 4 may thus be thus discharged upon an endless belt conveyor 6 or upon cars spotted beneath the discharge of the hopper 4, or the concrete discharged from the mixers may be received direct by any suitable means to carry the mixed concrete off to the point of use. By reason of the fact that I employ in this construction tilting mixers 3, it will be apparent that a relatively limited amount of movement of each mixer 3 is required to shift the same from its mixing or charging position as illustrated by the adjustment of the mixer 3 at the left in Figure 1, to its discharging position as illustrated by the adjustment of the mixer 3 at the right in Figure 1. At all times, whether the mixers are in their charging and mixing, or their discharging positions, the common charging and discharging end is disposed above what I have termed the discharge and charging zone located above the open end of the hopper 4, or beneath the selective charging chute 7 or axis of hopper 2.

The provisions for charging the mixers 3 include the following: Leading downwardly from the collecting hopper 2 at a sharp inclination is a selective charging or distributing chute 7 adapted to be rotated to bring its lower end above any one of the charging chutes 8, one of which is located adjacent to the charging portion of each mixer 3. At its upper end the chute 7 is rotatively mounted upon the collecting hopper 2 in any suitable manner. The turning of the chute 7 is compelled by any suitable instrumentalities, not illustrated, the same either mechanically or manually operated. The chute 7 carries a water receiving pan 9 having a discharge spout 10, the pan being located beneath the discharging end of a water conduit or pipe 11 adapted to supply a predetermined or measured quantity of water from the tank 12 to the pan 9, from which pan the water will be discharged into a predetermined one of the chutes 8, depending upon the position at which the turn head chute 7 is adjusted. Whereas heretofore a chute having a function equivalent to the charging function of the chute 7 would be provided leading to the outer end of the mixer and having an angular return portion requiring a multi-directional flow of the dry aggregates was required to be used, I am enabled to do away with such type chute, availing of the short chute 7 pitched at a sharp downward angle and permitting a free direct flow of the aggregates from the hopper 2 therethrough and through the cooperative chute 8 directly into the charging portion of the mixer. The members 7 and 8 being relatively shallow, vertically speaking, the fore-shortening of these parts, as compared with the longer chutes heretofore required, permits a much lower elevation of the collecting hopper 2 than heretofore possible. On this account the entire frame structure of the mixing plant may be reduced in height, affording material saving in cost of erection and economy of materials. In a plant of a certain single size, this saving has been as great as to produce a reduction of 15,000 lbs. in the weight of the fabricated materials used and a reduction in cost amounting to as much as $900.00. In larger plants the saving would be greater and in smaller plants correspondingly less. The operations of charging and discharging the mixers 3 are quite evident from Figure 1, wherein the chute 7 is shown cooperating with a chute 8 to charge the mixer 3 illustrated at the left, while the mixer 3 illustrated at the right has been operated to cause it to assume discharging position, wherein its contents pass to the mixed concrete hopper 4, or direct to any suitable means to carry the mixed concrete off to the point of use.

In Figures 3 and 4 a modification of my construction is disclosed wherein the parts which are the same as those heretofore described are indicated by the same reference characters. However, in the modified construction I employ a plurality of non-tilting mixers 3a equipped at their inner ends with combined charging and discharging chutes 13, one for each mixer, the said chutes 13 cooperating with supply chutes 14 intermediate them and the selector or distributing chute 7. In this construction the water supply pan 9 supplies the water for each batch of dry aggregates to an individual pipe 15, one of which is provided for each mixer 3a and leads to a water feed receptacle 16 carried by suitable framework at the outer end of each mixer. The combined charging and discharging chutes 13 are operative in the charging zone for the mixed concrete receptacles 4 and the arrangement of parts just set forth affords similar advantages to those that are derived according to the construction of Figures 1 and 2, wherein the tilting mixers are availed of. In other words, the framework A of the plant is susceptible of being foreshortened vertically by reason of the use of the short abruptly pitched selective charging chute 7 and the location of the charging and discharging means for each mixer in the charging zone above the hopper 4, or point of disposal of mixed concrete, and closely disposed relatively to the center axis of the entire plant and corresponding axes of the hoppers 2 and 4.

In both the constructions of my invention, as typified herein, a very fast charging action of the mixers 3 and 3a is afforded by reason of the comparatively short length of the passage through which the aggregates are caused to travel from the hopper 2 to each mixer. The advantages said constructions have are the compactness of the arrangements of the collecting hoppers, mixed concrete hoppers, mixers, and the charging and discharging features as set forth above, with the resultant advantages previously presented.

Since the member 4 may be a hopper, carbody, or any desired type of receptacle or holder means, it may be broadly characterized as a receiver for mixed concrete.

Having thus described my invention, what I claim as new and desire to secure by Letters Patent of the United States, is—

1. In a central mixing plant, in combination, a collecting hopper for different aggregates, a mixed concrete hopper having its upper end open to provide a charging zone thereabove, mixers disposed in a plane between said hoppers and having charging and discharging means disposed substantially in said charging zone, and means to convey aggregates from the collecting hopper to the mixers, comprising a distributing turn head chute on the collecting hopper at its discharge portion, said chute having its lower end shiftable in the charging zone above the mixed concrete hopper to enable the chute to charge any selected mixer at will.

2. In a central mixing plant, a plurality of mixers having charging openings, said mixers being disposed with their charging openings directed towards a common center, and said mixers being further adapted to discharge towards the aforesaid common center, an aggregate collecting hopper supported at an elevation above said mixers, a movable distributing chute leading from said aggregate collecting hopper and adjustable about a vertical axis passing substantially through the common center aforesaid to direct aggregates from the hopper to any selected one of the mixers, and a mixed concrete receiver common to all of the mixers and disposed below the mixers, the said receiver being open at its upper end and extending laterally about a vertical axis passing through the aforesaid common center so as to be capable of selectively receiving mixed concrete from the mixers.

3. A concrete mixing plant comprising: a concrete receiving hopper; a plurality of mixers grouped in a plane above the hopper with their discharging ends arranged to discharge into the hopper, said mixers being of the type wherein the drum may be loaded and discharged at the same end; an aggregate bin above the mixers; and a swingable discharge chute at all times in position to receive aggregates from the bin and movable to direct the flow thereof directly into the combined charging and discharging opening of any selected mixer.

4. A concrete mixing plant comprising: at least two mixers of the tilting drum type that may be charged and discharged at the same end; a concrete receiving hopper; means mounting the mixers with their charging and discharging ends pointing toward the center of the hopper so that each mixer discharges into the hopper; an aggregate supply hopper above the mixers, said hopper having a discharge opening substantially in vertical alignment with the concrete receiving hopper; and a short adjustable chute structure for selectively conducting aggregates from said discharge opening into any one of the mixer drums.

5. In a central mixing plant, in combination: a collecting hopper for different aggregates; a mixed concrete hopper having its upper end open to provide a charging zone thereabove; a plurality of mixers disposed in a plane between said hoppers and having charging and discharging means disposed substantially in said charging zone; and means to convey aggregates from the collecting hopper to any one of the mixers comprising, a swingable distributing chute cooperating with the collecting hopper at its discharge portion and having one end shiftable in the charging zone above the mixed concrete hopper to enable the chute to charge any selected mixer at will.

6. A concrete mixing plant comprising: a concrete receiving hopper; a plurality of mixers grouped in a plane above the hopper, said mixers being of the tilting drum type that may be charged and discharged at the same end, and being so arranged with relation to the receiving hopper that their drum axes intersect the vertical axis of the receiving hopper with their charging and discharging ends pointing toward said vertical axis; an aggregate supply above the mixers having a discharge located substantially on said vertical axis and near the combined charging and discharging ends of the mixer drums; and means for selectively conducting aggregates from the discharge of said aggregates supply into any one of the mixer drums including a swingable distributing chute at all times positioned for reception of aggregates from the discharge of the aggregate supply and movable bodily to direct aggregates to any one of the mixer drums.

CHARLES S. JOHNSON.